United States Patent
Marangoni

(10) Patent No.: US 8,012,281 B2
(45) Date of Patent: Sep. 6, 2011

(54) FEED UNIT FOR FEEDING ELASTOMERIC MATERIAL TO A USER UNIT

(75) Inventor: Giorgio Marangoni, Rovereto (IT)

(73) Assignee: Marangoni Meccanica S.p.A., Rovereto (IT)

( * ) Notice: Subject to any disclaimer, the term of this patent is extended or adjusted under 35 U.S.C. 154(b) by 258 days.

(21) Appl. No.: 12/162,884

(22) PCT Filed: Jan. 31, 2007

(86) PCT No.: PCT/IB2007/000223
§ 371 (c)(1),
(2), (4) Date: Dec. 29, 2008

(87) PCT Pub. No.: WO2007/088455
PCT Pub. Date: Aug. 9, 2007

(65) Prior Publication Data
US 2009/0223637 A1 Sep. 10, 2009

(30) Foreign Application Priority Data

Feb. 1, 2006 (IT) .............................. TO2006A0065

(51) Int. Cl.
*B29D 30/16* (2006.01)
(52) U.S. Cl. ........ 156/117; 156/123; 156/397; 156/406; 198/303; 198/348
(58) Field of Classification Search .................. 156/117, 156/123, 397, 406; 198/303, 348
See application file for complete search history.

(56) References Cited

U.S. PATENT DOCUMENTS

| | | | |
|---|---|---|---|
| 3,455,764 A | 7/1969 | Bryant | |
| 3,904,024 A * | 9/1975 | Smith | 414/788.7 |
| 4,240,863 A * | 12/1980 | Vinton | 156/361 |
| 4,279,555 A * | 7/1981 | Rydell | 414/793.8 |
| 4,776,449 A * | 10/1988 | Hoffmann et al. | 198/508 |
| 6,554,041 B1 | 4/2003 | Ohki et al. | |
| 2001/0050135 A1 | 12/2001 | Takaoka | |

FOREIGN PATENT DOCUMENTS

| | | |
|---|---|---|
| DE | 1556022 | 1/1970 |
| DE | 41 11 740 A | 10/1992 |
| EP | 0 635 648 A | 1/1995 |
| WO | WO 2005/009726 A | 2/2005 |

* cited by examiner

*Primary Examiner* — Christina Johnson
*Assistant Examiner* — Martin Rogers
(74) *Attorney, Agent, or Firm* — Frommer Lawrence & Haug LLP; Ronald R. Santucci

(57) ABSTRACT

A feed unit for feeding elastomeric material, extruded by at least one extruder, to at least one user unit, and wherein a variable-length conveyor is supported by a first and a second supporting device located at an input end and an output end of the conveyor respectively; and wherein the first supporting device is connected to the conveyor to allow the conveyor to rotate about a vertical first axis and a horizontal second axis, both crosswise to a travelling direction of the elastomeric material along the conveyor; the second supporting device is extensible vertically and connected to the conveyor by a first releasable joint; and the conveyor is connectable to the user unit by a second releasable joint.

15 Claims, 3 Drawing Sheets

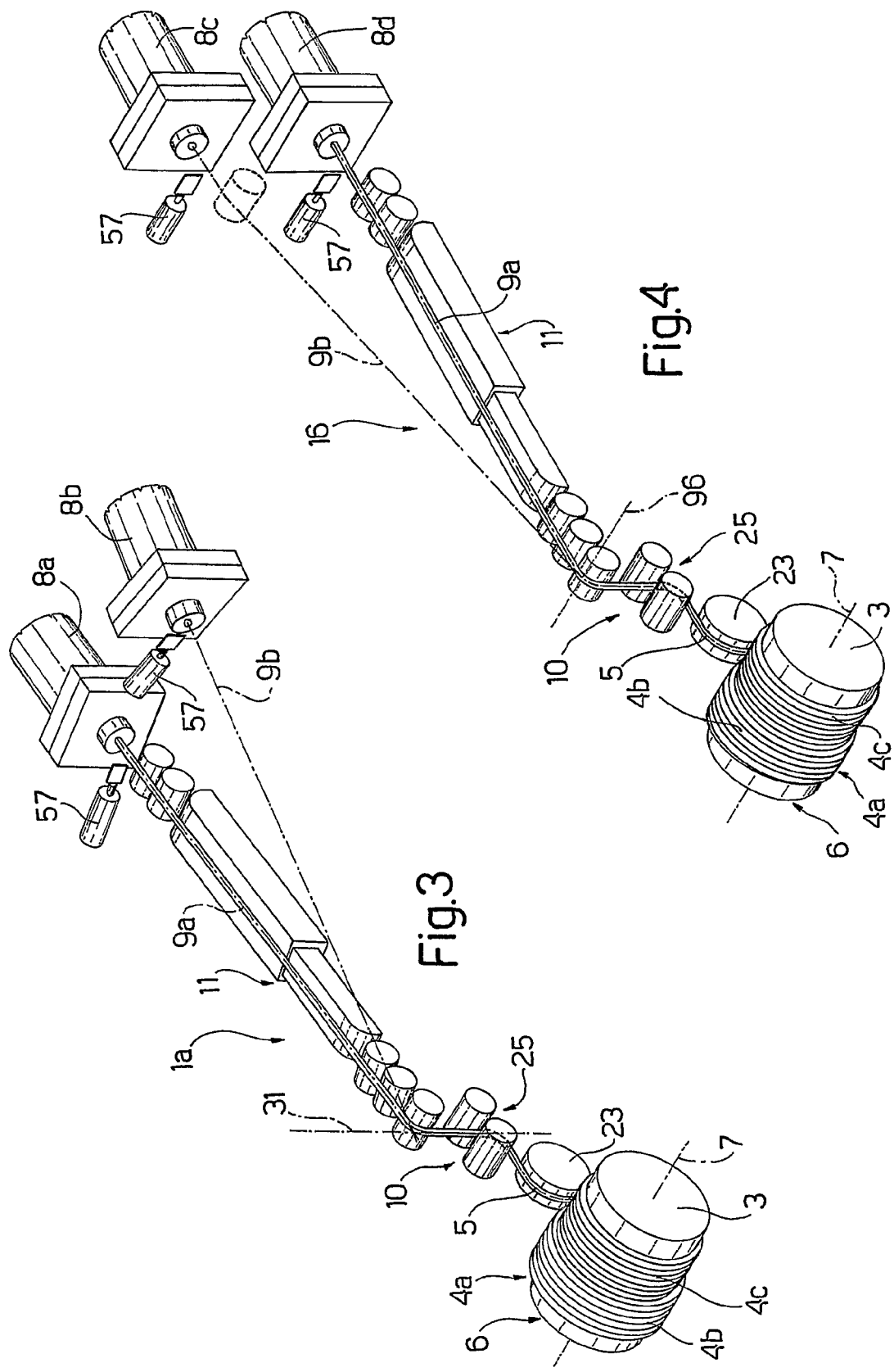

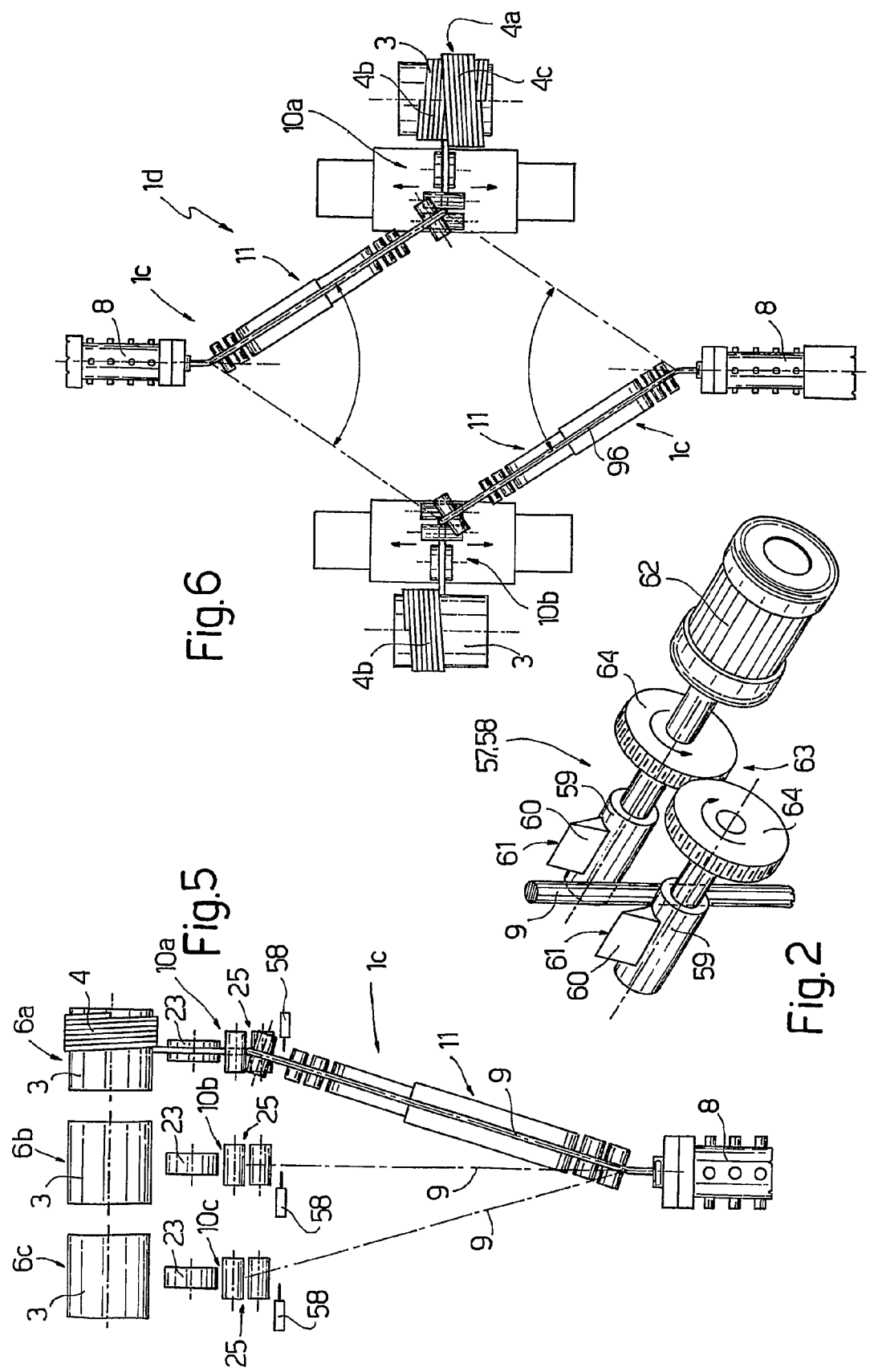

FEED UNIT FOR FEEDING ELASTOMERIC MATERIAL TO A USER UNIT

This application is a 371 of PCT/IB2007/000223 filed on Jan. 31, 2007, published on Aug. 9, 2007 under publication number WO 2007/088455 A which claims priority benefits from Italian Patent Application No. TO2006A000065 filed Feb. 1, 2006, the disclosure of which is incorporated herein by reference.

TECHNICAL FIELD

The present invention relates to a feed unit for feeding elastomeric material to a user unit.

The present invention may be used specifically and preferably in systems, in which at least one extruder is used to feed extruded elastomeric material, normally in rope form, to at least one unit for applying the extruded elastomeric material to a rubber-covering surface of a toroidal body, such as a vehicle tyre carcass, rotated about a respective axis, to form a cover layer on the rubber-covering surface, e.g. a layer constituting a component part of the tyre.

DISCLOSURE OF INVENTION

It is an object of the present invention to provide a relatively straightforward, low-cost, multipurpose feed unit that can be used in different types of systems to produce homogenous cover layers, i.e. made of one mix, or multilayer cover layers, i.e. formed by superimposing two or more homogeneous layers of respective different mixes.

According to the present invention, there is provided a feed unit for feeding extruded elastomeric material to a user unit, as claimed in Claim 1 and preferably in any one of the Claims depending directly or indirectly on Claim 1.

BRIEF DESCRIPTION OF THE DRAWINGS

A non-limiting embodiment of the present invention will be described by way of example with reference to the accompanying drawings, in which:

FIG. 2 shows a larger-scale view in perspective of a preferred embodiment of a detail in FIG. 1;

FIGS. 3 to 6 show respective variations of the FIG. 1 system.

BEST MODE FOR CARRYING OUT THE INVENTION

Figure 1:
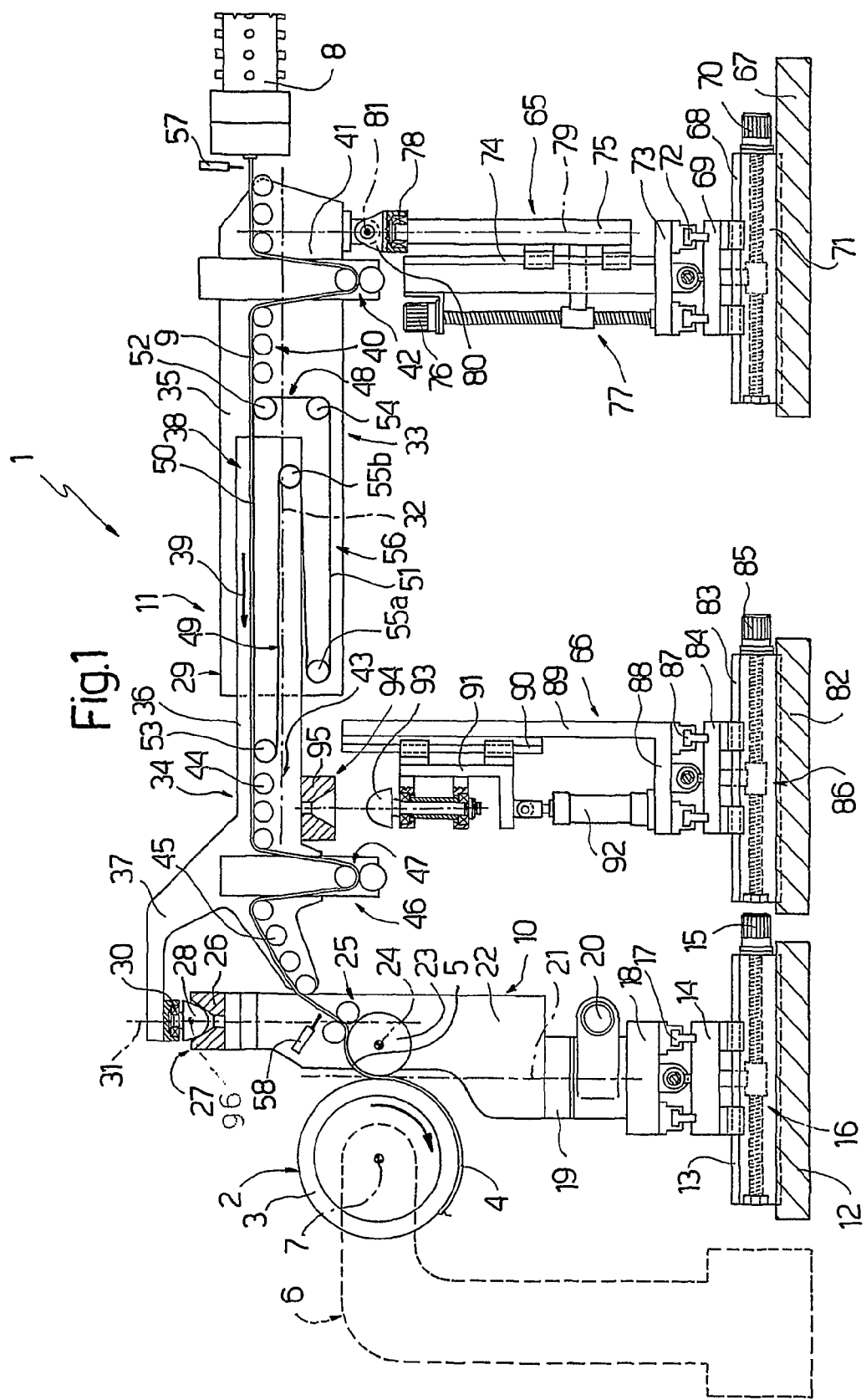
FIG. 1 shows a schematic side view of a system comprising a preferred embodiment of the feed unit according to the present invention.

Number 1 in FIG. 1 indicates as a whole a system for forming a layer 4 of elastomeric material on a rubber-covering surface 2 of a toroidal body 3, e.g. a tyre carcass, by applying a shaped strip 5 of elastomeric material.

System 1 comprises a unit 6 for supporting and rotating toroidal body 3 about a horizontal axis 7; an extruder 8 for producing a rope 9 of rubber; a forming unit 10 for receiving and drawing rope 9 into shaped strip 5, and for applying shaped strip 5 onto surface 2; and a feed unit 11 interposed between extruder 8 and forming unit 10 to feed rope 9 to an input of forming unit 10.

Forming unit 10 is substantially known, and comprises a bed 12 having a horizontal guide 13 on top, crosswise to axis 7 and along which runs a carriage 14 powered by a motor 15 via a drive 16, e.g. a screw-nut screw drive. Carriage 14 in turn has a horizontal guide 17 on top, crosswise to guide 13 and normally parallel to axis 7, and along which runs a powered carriage 18 supporting a rotary fixture 19 rotated about a vertical axis 21 by a motor 20. A tubular frame 22 extends upwards from rotary fixture 19, rotates with rotary fixture 19 about axis 21, and houses an applicator roller 23, which is substantially tangent to axis 21, rotates on tubular frame 22 about a horizontal axis 24 crosswise to axis 21, and is moved into a position tangent to rubber-covering surface 2 by moving carriages 14 and 18. Applicator roller 23 receives shaped strip 5 from a powered roller calender 25 housed inside tubular frame 22, over applicator roller 23, to receive and shape rope 9 into shaped strip 5, and feed shaped strip 5 to applicator roller 23.

Tubular frame 22 extends above roller calender 25 to support a female portion 26 of a releasable ball and socket joint 27, which comprises a male portion 28 extending downwards from an output end of a frame 29 of feed unit 11, and connected to frame 29 by a bearing 30, the axis 31 of which is substantially vertical and extends, in use, through the centre of ball and socket joint 27, and through the input of calender 25.

Frame 29 is a telescopic frame, which has an axis 32 substantially crosswise to axis 7, and comprises a first portion—hereinafter referred to as "fixed portion" 33—adjacent to the outlet of extruder 8; and a second portion—hereinafter referred to as "movable portion" 34—which is mounted to slide on fixed portion 33, is fitted with male portion 28 of ball and socket joint 27, and is connectable to forming unit 10 by ball and socket joint 27.

More specifically, fixed portion 33 comprises a frame defined by a tubular body 35, through the end of which, facing forming unit 10, slides one end of a tubular beam 36 defining the frame of movable portion 34 and fitted, on its free end facing forming unit 10, with an L-shaped appendix 37, which extends beyond the relative end of tubular beam 36, is positioned, in use, over forming unit 10, and supports bearing 30 and male portion 28 of ball and socket joint 27.

Frame 29 supports a conveyor 38 for receiving rope 9 from extruder 8 and conveying rope 9 to forming unit 10 in a direction 39 substantially parallel to axis 32. Conveyor 38 comprises a possibly powered input roller bed 40 supported by tubular body 35 and having a central gap, through which operates a known takeup roller unit 41 supported by tubular body 35, and a takeup roller 42 of which moves through roller bed 40 in a substantially vertical direction crosswise to axis 32. Conveyor 38 also comprises a possibly powered output roller bed 43 supported by tubular beam 36 and having an input portion 44 coplanar with roller bed 40, and a downward-sloping output portion 45 terminating, in use, over the input of roller calender 25. Between input portion 44 and output portion 45, roller bed 43 has a gap, through which operates a known takeup roller unit 46 supported by tubular beam 36, and a takeup roller 47 of which moves through roller bed 43 in a substantially vertical direction crosswise to axis 32. Roller beds 40 and 43 are connected by a powered, variable-length, belt conveyor 48 comprising an endless belt 49 and defining a central portion of conveyor 38.

Belt conveyor 48 comprises a conveying branch 50—coplanar with roller bed 40 and with input portion 44 of roller bed 43—and a return branch 51, which are defined by an input pulley 52 fitted in rotary manner to tubular body 35, and by an output pulley 53 fitted in rotary manner to tubular beam 36. Return branch 51 winds about a guide pulley 54 fitted in rotary manner to tubular body 35, and about two guide pulleys 55a and 55b. Pulley 55a is fitted in rotary manner to tubular body 35, and pulley 55b is interposed between pulleys 54 and 55a, is fitted in rotary manner to tubular beam 36, and defines, with pulley 55a and for belt 49, a known variable-capacity store 56 for compensating the variations in length of conveying branch 50 caused by movable portion 34 moving with respect to fixed portion 33.

Finally, conveyor 38 comprises two cutting devices 57 and 58 for cutting rope 9. More specifically, cutting device 57 is fitted to tubular body 35, immediately upstream from roller bed 40, and cutting device 58 is fitted to tubular beam 36, at the output of roller bed 43.

Cutting devices 57 and 58 may be known straightforward guillotine devices, or, as shown in FIG. 2, at least one of cutting devices 57, 58, preferably at least cutting device 58, comprises two cutting cylinders 59 located on opposite sides of the path of rope 9, rotated in opposite directions about respective axes, and having respective blades 60, each of which extends radially outwards from an outer surface of relative cutting cylinder 59, and has a cutting edge 61 movable along a cylinder substantially tangent to the cylinder traveled by cutting edge 61 of the other blade 60. Cutting cylinders 59 are counter-rotated, in time with each other, by a motor 62, the output of which is connected to the input of a drive 63 comprising two identical meshing gears 64, each of which is coaxial and integral with relative cutting cylinder 59 to move relative cutting edge 61 in the same travelling direction as travelling direction 39 of rope 9 at a point at which cutting edge 61 is a minimum distance from the other cutting edge 61.

Conveyor 38 has two supporting and adjusting devices, one of which is a supporting device 65 connected permanently to tubular body 35 and adjacent to extruder 8, and the other is a temporary supporting device 66 adjacent to forming unit 10.

As shown in FIG. 1, supporting device 65 comprises a bed 67 having a horizontal guide 68 on top, substantially crosswise to axis 7 and along which runs a carriage 69 powered by a motor 70 via a drive 71, e.g. a screw-nut screw drive. Carriage 69 in turn has a horizontal guide 72 on top, crosswise to guide 68, and along which runs a powered carriage 73 supporting a vertical guide 74, along which slides an upright 75 powered by a motor 76 via a drive 77, e.g. a screw-nut screw drive. Upright 75 is fitted on top with a thrust bearing 78 having a vertical axis 79 and connected to the bottom surface of tubular body 35 by a hinge 80 having a horizontal axis 81 substantially parallel to axis 7.

As shown in FIG. 1, supporting device 66 comprises a bed 82 having a horizontal guide 83 on top, parallel to guide 68 and along which runs a carriage 84 powered by a motor 85 via a drive 86, e.g. a screw-nut screw drive. Carriage 84 in turn has a horizontal guide 87 on top, crosswise to guide 83, and along which runs a powered carriage 88 supporting an upright 89, along which extends a vertical guide 90 for a carriage 91, which is connected to carriage 88 with the interposition of a hydraulic jack 92, and supports the vertical-axis male portion 93 of a releasable ball and socket joint 94, the female portion 95 of which is connected integrally to a bottom surface of tubular beam 36.

Setup of system 1 will now be described as of the instant in which toroidal body 3 is fitted to supporting unit 6, forming unit 10 is positioned facing rubber-covering surface 2, with applicator roller 23 a given distance from rubber-covering surface 2, and extruder 8 is mounted facing and a given distance from forming unit 10, and at a given height, normally higher than the input of roller calender 25, with respect to forming unit 10.

At this point, feed unit 11, set beforehand so that it is shorter in length than the distance between extruder 8 and forming unit 10, is inserted, by operating carriages 73 and 88, between extruder 8 and forming unit 10 so that the input of roller bed 40 is aligned with the outlet of extruder 8, and appendix 37 is aligned with female portion 26 of ball and socket joint 27.

With supporting device 66 locked, upright 75 and carriage 69 are now operated to position the input of roller bed 40 at a height just beneath the outlet of extruder 8 and at a given distance from the outlet of extruder 8 respectively.

Next, with supporting device 65 locked, carriage 91 is raised by means of jack 92, so that the whole of conveyor 38 rotates upwards about axis 81, and male portion 28 of ball and socket joint 27 is set to a height above relative female portion 26. When carriage 84 is operated, and carriage 91 then lowered, the following occur in succession: conveyor 38 is lengthened to position male portion 28 directly over female portion 26; male portion 28 is inserted inside female portion 26 to engage ball and socket joint 27; and male portion 93 is withdrawn from female portion 95 to release ball and socket joint 94.

Feed unit 11 is thus set in the operating position resting at one end on supporting device 65, and at the other end on forming unit 10, which, by operating carriage 14, is moved to position applicator roller 23 substantially contacting rubber-covering surface 2.

Successive operation of extruder 8 and roller calender 25, operation of belt conveyor 48, programmed rotation (clockwise in FIG. 1) of toroidal body 3 about axis 7, and programmed operation of carriages 14 and 18 and rotary fixture 19 of forming unit 10 result, successively and in known manner, in the formation of rope 9, supply of rope 9 to roller calender 25 to form shaped strip 5, application of shaped strip 5 to rubber-covering surface 2, and the formation of layer 4.

In connection with the above, it should be pointed out that, if, as is often the case, supporting unit 6 is movable in the direction of axis 7, carriage 18 may be left locked when forming layer 4.

It should also be pointed out that, when forming layer 4, conveyor 38, as regards its length and its angular position about axis 79, is totally passive, and is lengthened, shortened, and rotated about axis 79 at all times by forming unit 10 by means of ball and socket joint 27.

In system 1, connecting one extruder 8 to one forming unit 10 to produce a homogenous layer 4, i.e. made from one mix, rope 9 is normally cut by cutting device 57, once layer 4 is formed, and cutting device 58 may even be dispensed with.

FIGS. 3 and 4 show respective systems 1a and 1b for covering rubber-covering surface 2 with a multilayer 4a comprising superimposed layers—in the example shown, two superimposed layers 4b and 4c—made of different mixes. This is done using a number of extruders 8, each for forming a respective rope 9 made of a respective mix; one forming unit 10; and one feed unit 11 connectable selectively to each of extruders 8 to feed ropes 9 selectively to forming unit 10.

More specifically, system 1a comprises two side by side extruders 8a and 8b located at the same height and for producing respective ropes 9a and 9b. In this case, feed unit 11 is connected selectively to extruders 8a and 8b by operation of carriage 73 rotating it about axis 31.

With reference to FIG. 1, if extruders 8a and 8b are positioned radially with respect to, and at the same distance from, axis 31, and guide 72 is a circular guide coaxial with axis 31, then carriage 69 remains locked, and the length of conveyor 38 remains constant as carriage 73 is moved. If the extruders are different distances from axis 31, carriage 69 is also operated when rotating feed unit 11 about axis 31.

Once the relative layer 4b, 4c is formed, each rope 9a, 9b is cut by cutting device 57.

System 1b comprises two extruders 8c and 8d superimposed in the same plane through axis 31, and for producing respective ropes 9b and 9a. In this case, feed unit 11 is connected selectively to extruders 8c and 8d by operation of upright 75 rotating it about a horizontal axis 96, extending parallel to axis 81 and through the centre of ball and socket joint 27, and simultaneously about axis 81 itself. If extruders 8c and 8d are positioned radially with respect to, and at the same distance from, axis 96, then carriage 69 remains locked, and the length of conveyor 38 remains constant as upright 75 is moved. If extruders 8c and 8d are different distances from axis 96, carriage 69 is also operated when rotating feed unit 11.

In this case, too, once the relative layer 4b, 4c is formed, each rope 9a, 9b is cut by cutting device 57.

By combining systems 1a and 1b, it is possible to obtain a system (not shown), in which one forming unit 10, served by one feed unit 11, is connectable selectively to a number of extruders 8 arranged in a given space (preferably in rows and columns) to form, on rubber-covering surface 2, a multilayer 4a defined by a number of superimposed layers, each made from a mix differing from those of the adjacent layers.

FIGS. 5 and 6 show respective systems 1c and 1d, in which an extruder 8 and one feed unit 11 are employed to feed the relative rope 9 to a group of forming units 10 arranged parallel and each connected to a respective supporting unit 6.

In the FIG. 5 example, the parallel forming units 10 are three in number, are indicated 10a, 10b, 10c, and are connected to respective supporting units 6a, 6b, 6c, though a different number of parallel forming units 10 may obviously be employed.

In this case, feed unit 11 is connected selectively to forming units 10a-10c by operation of carriage 88 rotating it about axis 79. More specifically, in actual use, feed unit 11 performs a succession of operating cycles, in each of which, feed unit 11 is first positioned between extruder 8 and forming unit 10a, as described relative to system 1. When layer 4 is nearly completed on the toroidal body 3 fitted to supporting unit 6a, rope 9 is cut by cutting device 58, and roller calender 25 of forming unit 10a is emptied to complete layer 4. At the same time, jack 92 is operated to engage ball and socket joint 94, rotate frame 29 upwards about axis 81, release ball and socket joint 27 connecting feed unit 11 to forming unit 10a, and withdraw male portion 28 completely from female portion 26 of forming unit 10a. With frame 29 still in the raised position, carriage 88 and possibly also carriage 84 are operated to rotate conveyor 38 about axis 79 and possibly adjust the length of frame 29 to position male portion 28 directly over female portion 26 of forming unit 10b. At which point, jack 92 is lowered to connect feed unit 11 to forming unit 10b as described relative to system 1.

Once layer 4 is completed on the toroidal body 3 fitted to supporting unit 6b, rope 9 is cut by cutting device 58, roller calender 25 of forming unit 10b is emptied to complete layer 4, and feed unit 11 is disconnected from forming unit 10b and connected first to forming unit 10c, as described above, and then again to forming unit 10a.

In the FIG. 6 system 1d, two systems 1c—sharing two forming units 10a, 10b and offset by half a cycle—are used to feed respective ropes 9a and 9b to the two forming units 10a, 10b to form, on respective toroidal bodies 3, respective multilayers 4a, each defined by two superimposed layers 4b and 4c made from respective different mixes.

The invention claimed is:

1. A system for forming a layer of elastomeric material on at least one toroidal body, the system comprising a supporting unit for rotating the toroidal body about a respective axis of rotation; at least one extruder for producing a rope of elastomeric material; at least one forming unit connected to the supporting unit and for converting the rope into a shaped strip and applying the shaped strip to the toroidal body to form said layer; and at least one feed unit for feeding the rope from the extruder to the forming unit; the system wherein the feed unit comprises a variable-length conveyor comprising a variable-length frame; a first supporting device connected to the frame at an input end of the conveyor to allow the conveyor to rotate about a vertical first axis and a horizontal second axis, both crosswise to a travelling direction of the elastomeric material along the conveyor; a first releasable joint interposed between the frame and the forming unit at an output end of the conveyor; and a second supporting device connectable releasably, by a normally-open second releasable joint, to the frame at the output end of the conveyor.

2. A system as claimed in claim 1, wherein the first supporting device comprises first extension means for adjusting the height of the input end of the conveyor.

3. A system as claimed in claim 1, wherein the second supporting device comprises second extension means for adjusting the height of the output end of the conveyor, and for engaging and releasing the second releasable joint.

4. A system as claimed in claim 1, wherein the first and second releasable joint each comprise a male portion and a female portion detachable in a substantially vertical direction.

5. A system as claimed in claim 1, wherein the first and second releasable joint are each a ball and socket joint.

6. A system as claimed in claim 1, wherein said first and said second supporting device are each movable in a respective first and respective second horizontal direction perpendicular to each other.

7. A system as claimed in claim 1, wherein the forming unit comprises an applicator roller having, in use, at least one point of substantial tangency with the toroidal body; and a rotary fixture allowing the forming unit to rotate about a vertical axis passing substantially through the point of tangency; actuating means being provided to impart a first relative movement of the forming unit with respect to the toroidal body in a direction parallel to the axis of rotation of the toroidal body, and a second relative movement of the forming unit with respect to the toroidal body in a direction crosswise to the axis of rotation of the toroidal body.

8. A system as claimed in claim 1, wherein the forming unit has an input; and wherein the first releasable joint permits rotation of the forming unit and the feed unit with respect to each other about a substantially vertical third axis passing through said input, and about a substantially horizontal fourth axis.

9. A system as claimed in claim 1, and comprising at least two extruders; one forming unit connected to the supporting unit supporting the relative toroidal body; and one feed unit connected, at the output, to the forming unit by the first releasable joint, and connectable selectively, at the input, to the extruders.

10. A system as claimed in claim 8, wherein the two extruders are located at the same height; the feed unit being selectively connectable to the extruders by at least rotating about the third axis.

11. A system as claimed in claim 8, wherein the two extruders are located at respective different heights; the feed unit being selectively connectable to the extruders by at least rotating about the fourth axis.

12. A system as claimed in claim 9, and comprising a cutting device for cutting the rope; the cutting device being located at said input end.

13. A system as claimed in claim 1, and comprising one extruder; at least two forming units, each connected to a respective supporting unit supporting the relative toroidal body; and one feed unit connected, at the input, to the extruder, and connectable selectively, at the output, to the forming units by the respective first releasable joints and by rotating about the first and second axis.

14. A system as claimed in claim 13, and comprising a cutting device for cutting the rope; the cutting device being located at said output end.

15. A system as claimed in claim 1, and comprising a first and a second extruder; a first and a second forming unit, each connected to a respective supporting unit supporting the relative toroidal body; and a first and a second feed unit connected, at the input, to the first and second extruder respectively, and connectable selectively, at the output, to the first and second forming unit by the respective first releasable joints and by rotating about the respective first and second axis.

* * * * *